United States Patent [19]

Orii

[11] Patent Number: 4,616,737
[45] Date of Patent: Oct. 14, 1986

[54] BUFFER DEVICE

[75] Inventor: Makoto Orii, Nagano, Japan

[73] Assignee: Kabushiki Kaisha Sankyo Seiki Seisakusho, Nagano, Japan

[21] Appl. No.: 677,330

[22] Filed: Dec. 3, 1984

Related U.S. Application Data

[63] Continuation of Ser. No. 384,113, Jun. 1, 1982, abandoned.

[30] Foreign Application Priority Data

Jun. 3, 1981 [JP] Japan .................. 56-81043[U]

[51] Int. Cl.[4] .............................................. B60T 8/02
[52] U.S. Cl. .................. 188/184; 192/103 B; 192/105 CD
[58] Field of Search ............ 188/184; 192/103 B, 192/105 CD; 179/90 A, 90 R

[56] References Cited

U.S. PATENT DOCUMENTS

| 1,396,951 | 11/1921 | Fowkes | 188/184 |
| 1,514,851 | 11/1924 | Gormley | 188/184 X |
| 1,687,127 | 10/1928 | Gormley | 188/184 |
| 3,327,825 | 6/1967 | Fann | 188/184 X |

FOREIGN PATENT DOCUMENTS

| 520514 | 3/1931 | Fed. Rep. of Germany | 188/184 |
| 1134422 | 8/1962 | Fed. Rep. of Germany | 188/184 |
| 1252266 | 10/1967 | Fed. Rep. of Germany | 188/184 |
| 812696 | 4/1959 | United Kingdom | 188/184 |
| 963330 | 7/1964 | United Kingdom | 188/184 |

Primary Examiner—George E. A. Halvosa
Attorney, Agent, or Firm—Sughrue, Mion, Zinn Macpeak & Seas

[57] ABSTRACT

A buffer or damping device affixable as a unit to a rotating gear 22. The buffer includes a first gear 2, 3 engaging the rotating gear and a geared one-way clutch 4. The clutch is linked to a worm 7c on a shaft 7. A damping member 8 is fixed to the shaft and it expands under rotation to frictionally contact a sliding contact member 6 to thereby damp the rotation of the rotating member. All elements are enclosed in a case 1 and cover 9, except a portion of the first gear.

6 Claims, 11 Drawing Figures

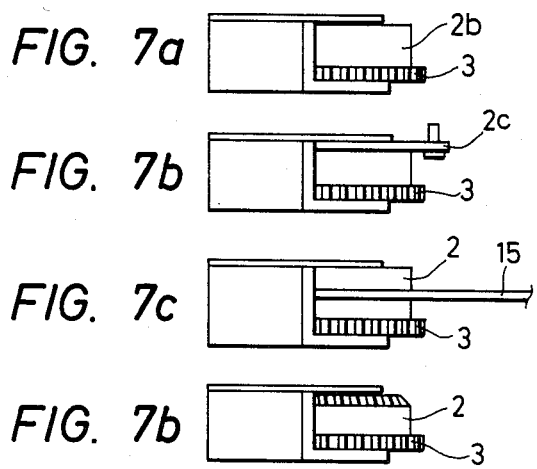
FIG. 7a
FIG. 7b
FIG. 7c
FIG. 7b
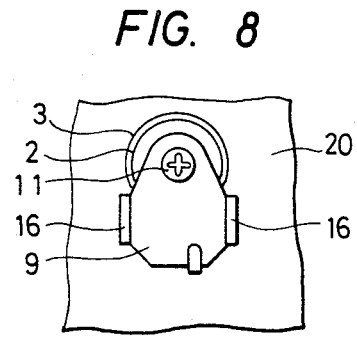
FIG. 8

BUFFER DEVICE

This is a continuation of application Ser. No. 384,113, filed June 1, 1982, now abandoned.

BACKGROUND OF THE INVENTION

This invention relates to a buffer device for use in controlling the speed of motion of a controlled reciprocating member in either stroke, i.e. in either the forward stroke or the reverse stroke, by utilizing a damping mechanism such that a damping member is rotated within a sliding contact chamber.

As well known heretofore, there can be used various types of damping mechanisms for use in a "soft" ejecting device of cassette type tape recorders and cassette type video tape recorders, and these include the centrifugal force type, inertia type, friction type, oil type and air type. Among them a damping mechanism of the air governor type is the most insusceptible to changes in ambient conditions, the degree of machining accuracy of the parts and other requirements. In the damping mechanism of the air governor type, however, a vane wheel is rotated at a high speed so as to obtain a damping force, thus resulting in disadvantages such that the speed ratio becomes larger than in other types and, hence, the wheel or gear train and the vane wheel are apt to generate noise. Furthermore, the structure of the mechanism is increased in size and cannot be made thin, entailing another disadvantage such that the mechanism is not suitable for use in damping devices of small size. Since the damping force is proportional to the area of the vanes, the size of the device may not be arbitrarily reduced without a consequent reduction in damping ability. If a case for enclosing the air governor mechanism is used, the damping effect itself is reduced.

In case of friction type mechanism, when a speed increase is desired through a gear train, a high acceleration cannot be obtained, and if a strong force is applied, "cocking" may be caused.

SUMMARY OF THE INVENTION

An object of this invention is to solve the foregoing problems in the prior art and to provide a thin type compact buffer device which has a simple construction and can be easily assembled.

In particular, the invention provides a damping member integrally provided on a worm shaft and formed of an elastic substance such as rubber, which member is made to open outwardly due to a centrifugal force. The combination of a worm and a worm gear is included in the gear train in addition to the damping mechanism of the centrifugal force type, to thereby achieve compact construction. At the same time, the buffer device is designed so as to be easily assembled by merely dropping respective parts in from above in proper order. Therefore, the assembly operation is greatly facilitated.

The use of a worm allows the construction to be compact while allowing an increased speed increasing ratio, so that the damping member can be reduced in weight. Because of the light damping member, the degree of inertia is lowered, avoiding unfavorable vibration. The damping member, when formed of an elastic substance such as rubber is also quiet in operation.

BRIEF DESCRIPTION OF THE DRAWINGS

FIGS. 7(a)–7(d) are explanatory views showing other embodiments of the driven rotary member; and FIG. 8 is an explanatory view showing an installation where the buffer device is secured to the chassis by the use of vertical lugs.

DETAILED DESCRIPTION OF THE PREFERRED EMBODIMENTS

Figure 1:
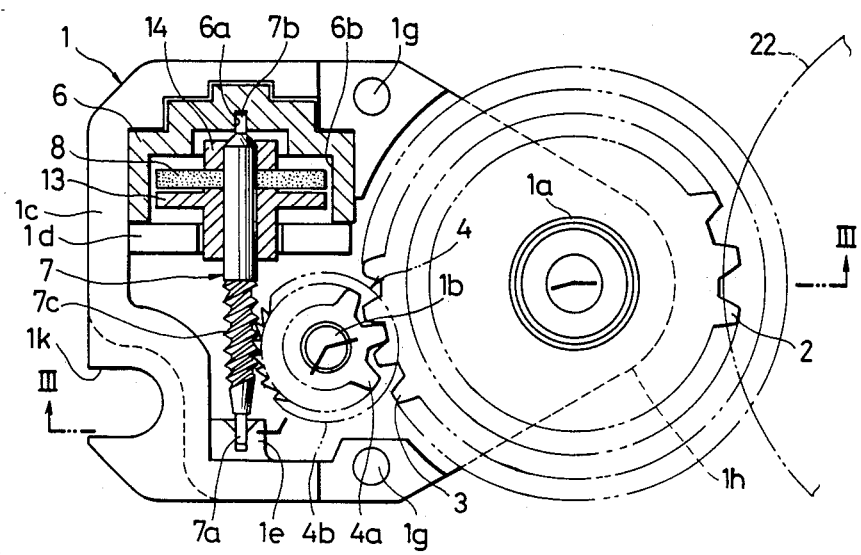
FIG. 1 is a sectional plan view showing essential parts of the buffer device of the invention.
Figure 2:
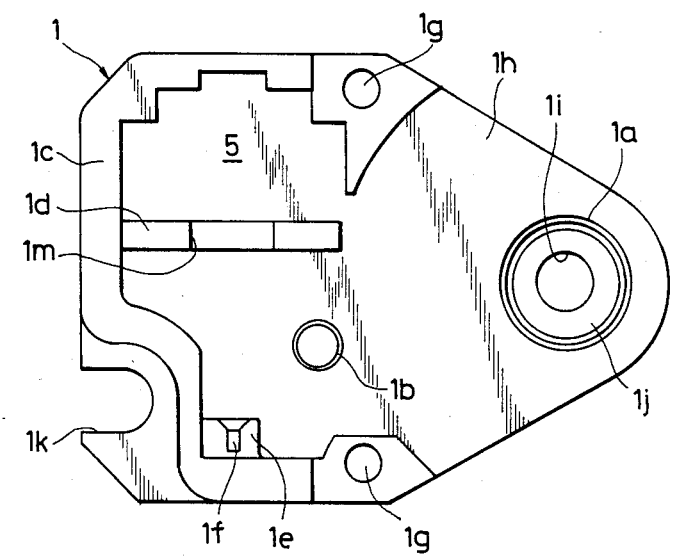
FIG. 2 is a top plan view of a case body.
Figure 3:
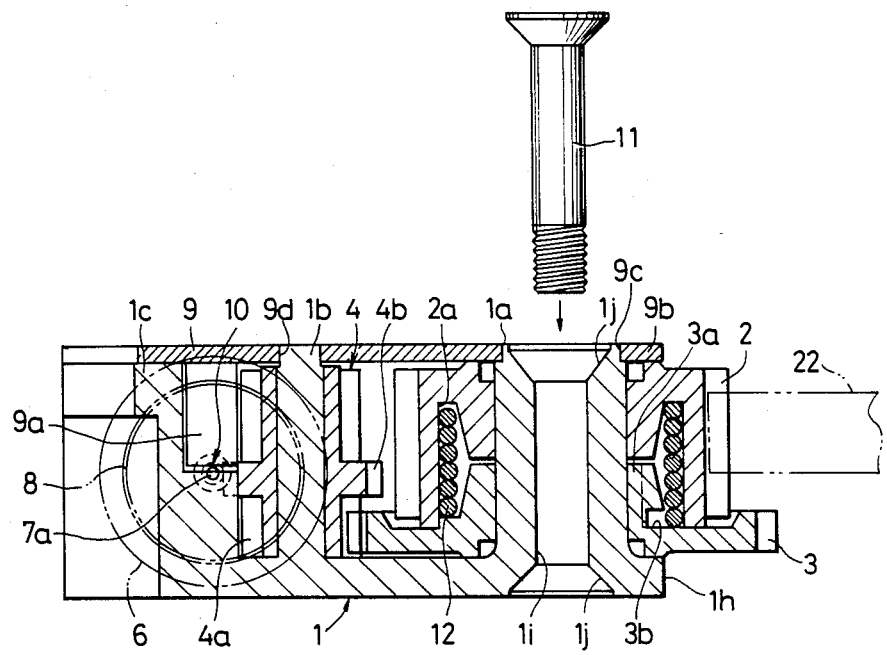
FIG. 3 is a sectional side view taken along the line III—III of FIG. 1.
Figure 4:
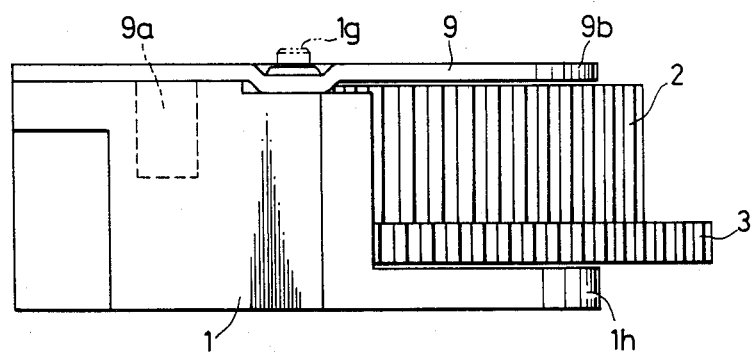
FIG. 4 is a side view of the buffer device.

Referring to FIGS. 1 and 2, a case body 1 of the buffer device includes a pair of vertical shafts 1a and 1b, the former of which supports a driven rotary member 2 and a gear 3 constituting a gear train, and the gear 3 meshes with a gear 4. A sliding contact chamber 6 is fitted into an accommodating chamber 5 which is defined by a vertical wall 1c and a cover wall 1d integrally formed in the case body 1, while a worm 7 rotated by said gear 4 has a tenon 7a at one end thereof. The tenon 7a is received in a U-shaped slot 1f in a tenon receiving stepped portion 1e which is formed inside of the vertical wall 1c. Another tenon 7b formed at the other end of the worm wheel 7 is pivotably supported by a bearing portion 6a which is formed at the bottom of the sliding contact chamber 6, while a damping member 8 provided on the worm 7 is positioned so as to confront an inner peripheral wall 6b of the sliding chamber 6. As shown in FIGS. 3 and 4, a cover plate 9 is placed on the case body 1 and then secured by hot melting with the use of set pins 1g, 1g provided on the vertical wall 1c at two points thereof. A projection or vertical lug 9a provided at the under side of the cover plate 9 is located on the tenon receiving stepped portion 1e so as to constitute a bearing portion 10. In such a manner, although the projection 9a functions as a bearing for the tenon 7a together with the tenon receiving stepped portion 1e, it may be formed as a separate member. In this case, however, the assembling efficiency is reduced to some degree.

As will be seen from FIGS. 1 to 3, the cover plate 9 and a bottom plate of the case body 1 have a rectangular form including conical projections 1h, 9b, respectively, so that a gear of the driven rotary member 2 is exposed to the outside at as great an angular range as possible. A through hole 1i is bored at the center of the shaft 1a, and the through hole 1i is formed at one end or both ends thereof with a countersink 1j corresponding to the head of a set screw 11. The shafts 1a, 1b have stepped smaller diameter portions at the upper ends thereof, which are fitted into through holes 9c, 9d formed in the cover plate 9, respectively. The bottom plate of the case body 1 is formed at one corner with a slot 1k used for positioning and securing.

The driven rotary member 2 and the gear 3 are formed as spur gears, and the driven rotary member 2 has a recessed portion 2a at one side thereof. The gear 3 is formed at one side thereof with a truncated cone 3a and a spring locking slot 3b. A coil spring 12 is interposed along the inner peripheral wall of the recessed portion 2a. One end of the coil spring 12 is locked by the spring locking slot 3b, to thereby constitute a one-way rotation clutch. More specifically, when the driven rotary member 2 is rotated in the counterclockwise direction by a controlled reciprocating member 22 serving as a drive source in FIG. 1, the coil spring 12 is increased in its outer diameter due to the contact friction between the inner peripheral wall of the recessed portion 2a and the coil spring, so that the rotation of the driven rotary member 2 is transmitted to the gear 3. To the contrary, when the driven rotary member 2 is rotated in the clockwise direction, the coil spring 12 is subject to a force acting thereon to make its outer diameter decrease, so that the driven rotary member slips against the gear 3.

The gear 4 is composed of a splined portion 4a in mesh with the gear 3 and a worm gear 4b in mesh with a worm surface 7c formed on the shaft of the worm 7.

The aforesaid tenons 7a, 7b are formed at both the ends of the worm 7, respectively, while the aforesaid damping member 8 is fitted at one end portion of the shaft of the worm 7 and is held by retaining plates 13, 14 on either side, to thereby secure the damping member 8 by at least preventing relative rotation of the same. The retaining members are pressfitted on the shaft of the worm 7 to be secured thereto. The damping member 8 is formed of an elastic substance such as rubber and includes a pair of damping arms 8b, 8c extending from the center 8a, as will be see from FIG. 5.

In the situation where the damping member 8 is made of an elastic material, such as plastic, the damping device will be inoperative unless the damping member 8 is prevented from deforming and thus varying from its desired contact with the side wall 6b but instead is stabilized in its configuration. That is, if the damping member 8 is deformed, stable operation of the buffer device cannot be obtained. If the damping member 8 is accidentally trapped in the gap, the buffer device will halt, contrary to desired operation. These defects may be overcome by providing the simple retaining plate 13 or 14 in accordance with the present invention. As a result, stable and controlled operation of the buffer device is ensured with a minimal structure.

The sliding contact chamber 6 to be fitted into the accommodating chamber 5 is in the form of a substantially U-shaped recess and is formed at the center of the bottom thereof with the aforesaid bearing portion 6a. When the damping member 8 is rotated with the shaft 7, the respective damping arms 8b, 8c are opened in the circumferential direction due to the centrifugal force exerted thereon, so as to be brought into sliding contact with the recessed inner peripheral wall 6b. An open end of the sliding contact chamber 6 is enclosed by the aforesaid cover wall 1d. The cover wall 1d is formed at a position facing the outer portion of the shaft of the worm 7 or the boss of the retaining plate 13 with a U-shaped slot 1m to make it possible for the sliding contact chamber 6 and the worm wheel 7 to be dropped and fitted into the accommodating chamber 5 and the U-shaped slot 1f formed in the tenon receiving stepped portion 1e from above, respectively.

When assembling the buffer device, the gears 3 and 4 are positioned on the pair of shafts 1a, 1b provided vertically in the same horizontal plane from above (in the normal direction with respect to the sheet including FIG. 2), and then the driven rotary member 2 is similarly positioned on the gear 3. Next, after pivotably supporting the tenon 7b formed at the other end of the worm 7, including the damping member 8 secured thereto, on the bearing portion 6a of the sliding contact chamber 6, the thus pre-assembled sliding contact chamber 6 and the worm wheel 7 are fitted into the accommodating chamber 5 and the tenon receiving stepped portion 1e from above, respectively, with the tenon 7a formed at one end of the worm 7 being fitted into the U-shaped slot 1f in the tenon receiving stepped portion. Thereafter, the cover plate is secured in place. In this manner, the buffer device can be assembled with ease.

In the buffer device having the construction as stated above, when the driven rotary member 2 is rotated in the counterclockwise direction, this rotation is transmitted to the gear 3 via the coil spring 12, and then the rotation of the gear 3 is transmitted to the worm surface 7c via the gear 4 and the worm gear 4b, so that the worm 7 is rotated. When the worm is rotated, the damping member 8 is rotated within the sliding contact chamber 6, and the pair of damping arms 8b, 8c are opened outwardly to be brought into sliding contact with the inner peripheral wall 6b of the sliding contact chamber, so that the rotation of the worm wheel 7 is damped by the frictional force generated therebetween.

When using a damping member 8 with an outer diameter of 6 mm, for example, it is possible to fabricate a very thin, very small sized buffer device of the type mentioned above, which has a thickness of about 10 mm. Furthermore, a relatively high speed increase ratio can be obtained by the reduced number of parts, because of the utilization of the combination of a worm gear and a worm. This also contributes to making the construction of the buffer device more compact.

Figure 6:
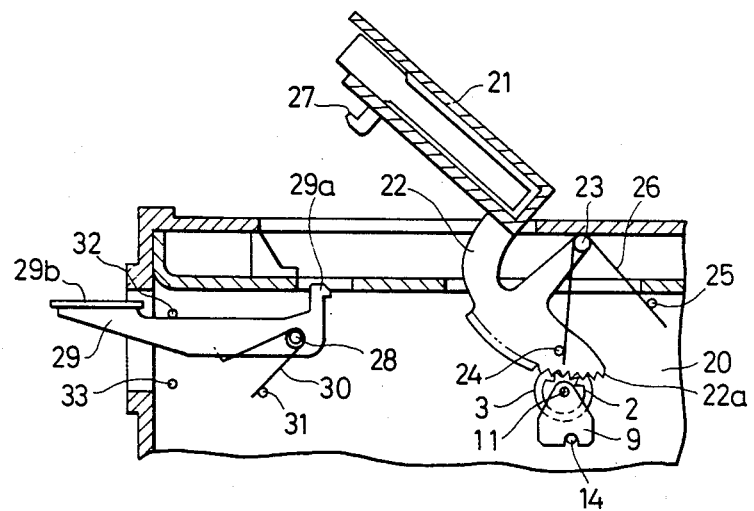
FIG. 6 is an explanatory view showing the case where the buffer device is incorporated in a soft ejecting device for tape recorders of the cassette type.

Hereinafter, the thus constructed buffer device will be described by way of a practical example, with reference to FIG. 6, in which the device is applied to a "soft" cassette ejecting device for use with tape recorders and video tape recorders of the cassette type, and a cassette case serves as the controlled member. In FIG. 6, a support plate 22 provided at the rear end of a cassette case 21 is rotatably held by a support shaft 23 fixed on the chassis 20. The support plate and the chassis have pins 24, 25, respectively. A coil spring 26 is wound about the support shaft 23 and has both ends thereof locked by the pins 24, 25, respectively, so that the spring 26 serves as a drive source, and hence the cassette case 21 is resiliently urged in the clockwise direction. The under side of the support plate 22 is shaped into the form of an arc and is formed with a fan-shaped gear 22a. The gear of the driven rotary member 2 of the buffer device according to the invention is in mesh with the fan-shaped gear, while the body of the buffer device is secured to the chassis 20 by means of a set screw 11 and a positioning pin 14. The cassette case 21 is provided at the front underside thereof with a hook 27, which is engaged with a hook 29a provided at the rear end of an ejecting control lever 29, this lever 29 being pivotably supported by a shaft 28 which is secured to the front portion of the chassis 20. The front end of the ejecting control lever 29 projects outside of the housing of the tape recorder, to thereby constitute a push button 29b. The shaft 28 of the control lever 29 includes a coil spring 30 wound thereabout, the coil spring 30 having one end locked by the control lever 29 and the other end locked by a pin 31 secured to the chassis 20. Therefore, the press button 29b is resiliently urged in the upward direction and its vertical motion is restricted by pins 32, 33 secured to the chassis 20.

The thus constructed effecting device operates as follows: In the normal state, the cassette case 21 is in a lowered position and the hooks 27, 29a are engaged with each other, so that resilient force is stored in the coil spring 26. As the press button 29b is depressed, the engagement of the hooks is released and hence the cassette case 21 is raised by the released resilient force of the coil spring. Thereupon, the drive rotary member 2 of the buffer device is rotated in the counterclockwise direction and the damping member 8 is also rotated in the sliding contact chamber. At this time, the rotation of the damping member is regulated to a constant speed, so that the ejecting device is operated to gently raise the cassette case.

Meanwhile, when the cassette case 21 is lowered by hand, the driven rotary member 2 is rotated in the clockwise direction. This rotation is not transmitted through the coil spring 12, so that the driven rotary member 2 slips against the gear 3. As a result, the cassette case 21 is lowered at a speed in accordance with the force exerted by the hand.

In the foregoing embodiment, the driven rotary member 2 was formed of a spur gear, but it may also be formed of an elastic friction wheel 2b such as a rubber roller as shown in FIG. 7(a), or it may be provided with a fixed lever 2c as shown in FIG. 7(b). FIG. 7(c) shows still another embodiment in which the driven rotary member is formed of a pulley 2d, and a belt 15 is used to transmit the rotation to the pulley 2d. In addition, the driven rotary member may be formed of a bevel gear 2e as shown in FIG. 7(d). Many more input methods are of course possible.

Figure 5:
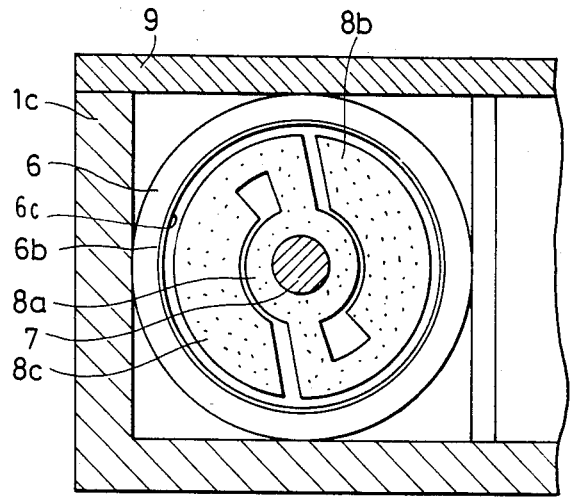
FIG. 5 is a front view of the damping member fitted in the sliding contact chamber.

As shown in FIG. 5, an elastic substance 6c such as a rubber may be bonded on the inner peripheral wall 6b of the sliding contact chamber 6, to thereby increase the coefficient of friction between the sliding contact chamber 6 and the damping member 8.

Although the buffer device was secured to the chassis 20 on the same side as the support plate 22 located at the left side of the cassette case 21 in the embodiment of FIG. 6, the device may be secured to the chassis on the same side as a support plate (not shown) located at the right side of the cassette case. In this case, it should be noted that the cover plate 9 is attached to the chassis, or the bottom plate of the case body is attached to the chassis similarly to the foregoing embodiment, the driven rotary member 2 and the gear 3 are turned upside down, the damping member 8 is inverted in the direction of its pair of damping arms, and the coil spring 12 is properly changed in the winding direction. In an embodiment where the cover plate is attached to the chassis, the chassis may be used as a cover plate so that the cover plate can be dispensed with. It is preferable that the case body 1 and the cover plate 9 be shaped into the conical form on the side of the driven rotary member 2, so as to expose the gear to the outside of the case body at an angular range as large as possible, as this permits the buffer device to be secured to the chassis sideways, i.e. leftward or rightward, in the case where there is no vertical space when mounted to the chassis. The exposed form of the gear may be modified into any form. In order to secure the buffer device to the chassis, one or two vertical lugs 16 may be provided on the chassis at one or both sides of the case body 1, as illustrated in FIG. 8, for facilitating the positioning of the case body. As stated above, by inserting the set screw 11 into the through hole 1i of the shaft 1a to secure the case body on the chassis, the driven rotary member 2 is rigidly secured at the center thereof. Therefore, the mounting of the buffer device is improved and there is assured a certain distance from the center of the external driven source irrespective of mounting position.

In the above, there has been described a practical example in which the buffer device was incorporated into an ejecting device for a tape recorders of the cassette type. However, the present buffer device is also applicable to any like movable elements where damping is required, such as doors and the like.

As fully explained hereinbefore, the buffer device is assembled in a manner such that the gear and the driven rotary member are provided on a pair of vertically provided shafts from above, respectively, the end of the worm wheel having the damping member secured thereto is supported by a bearing formed in the sliding contact chamber, and the thus pre-assembled sliding contact chamber and the worm may be fitted into the accommodating chamber and the tenon receiving stepped portion of the case body from above, followed by securing the cover plate in place. The buffer device can always be assembled with ease into a very thin, compact construction. Since the sliding chamber is housed within the accommodating chamber, noise due to the rotation of the damping member is considerably reduced. The damping member is formed of an elastic substance to increase the frictional force, so that the required gear ratio is lowered in order to obtain the same level of damping force comparing with the prior device of the air governor type, and, at the same time, the number of parts can be reduced. As a result, there can be provided a buffer device having superior practical effect, and requiring minimal space.

What is claimed is:

1. A buffer device, comprising:
    a first shaft having a worm portion;
    a worm gear engaged with said portion;
    a substantially planar damping member integrally formed of an elastic substance and connected to said first shaft at a central portion of said damping member, said damping member being outwardly openable and bending at an elastic portion of said damping member due to centrifugal force;
    fixed sliding contact means with which said damping member contacts at, at least, two portions of said damping member when said damping member is opened outwardly, whereby rotation of said worm gear is frictionally damped; and
    retaining means for holding said damping member;
    wherein said retaining means comprises a planar retaining plate confronted with and spaced apart from movable outer portions of said damping member and contacting inner portions of said damping member, said contacting preventing rotation of said inner portions of said damping member with respect to said retaining plate.

2. A buffer device as recited in claim 1, wherein said fixed sliding contact means forms a chamber coaxial with said first shaft.

3. A buffer device as claimed in claim 2, wherein said damping member comprises a central portion connected to said first shaft and at least two arms attached to said central portion and outwardly openable.

4. A buffer device as recited in claim 1, further comprising a one-way clutch engaged with and driving said worm gear.

5. A buffer device as recited in claim 1 further comprising:
    case means including a first case member and a second case member, said first case member and second case member cooperating with each other to define therein a receiving chamber; and gear means rotated by a drive source, said gear means including, on an input side, rotation input means, input speed increasing means and, on an output side, said first shaft including a worm portion, said gear means being encased in said case means except for a part of said input means.

6. A buffer device, comprising:

a first shaft having a worm portion;

a worm gear engaged with said worm portion;

a damping member integrally formed of an elastic substance and connected to said first shaft at a central portion of said damping member, said damping member being outwardly openable and bending at an elastic portion of said damping member due to centrifugal force;

fixed sliding contact means with which said damping member contacts at, at least, two portions of said damping member when said damping member is opened outwardly, whereby rotation of said worm gear is frictionally damped;

retaining means for holding said damping member, said retaining means comprising a retaining plate confronted with and spaced apart from outer movable portions of said damping member and contacting inner portions of said damping member and rotating with said damping member, said contacting preventing rotation of said inner portions of said damping member with respect to said retaining plate;

case means including a first case member and a second case member, said first case member and second case member cooperating with each other to define therein a receiving chamber;

gear means rotated by a drive source, said gear means including, on an input side, rotation input means, input speed increasing means and, on an output side of said first shaft rotated by the remainder of said gear means, said gear means encased in said case means except for a part of said input means; and wherein said retaining plate supports said damping member for preventing generation of undesired deformation of said damping member, said retaining plate being secured to said first shaft, wherein a radial gap defined between said retaining plate and said contact means is shorter than a thickness of said damping member.

* * * * *